United States Patent

[11] 3,576,051

| [72] | Inventors | Gaylon T. Click<br>Deer Park;<br>Edward M. Banta, Baytown, Tex. |
|---|---|---|
| [21] | Appl. No. | 840,578 |
| [22] | Filed | May 14, 1969<br>Division of Ser. No. 523,162, Jan. 26, 1966. |
| [45] | Patented | Apr. 27, 1971 |
| [73] | Assignee | Petro-Tex Chemical Corporation<br>Houston, Tex. |

[54] APPARATUS FOR PRODUCING THERMOPLASTIC FILM
10 Claims, 9 Drawing Figs.

[52] U.S. Cl. .................................................. 18/14S,
18/14G, 18/19RR, 264/95
[51] Int. Cl. .................................................. B29d 7/26,
B29d 23/04
[50] Field of Search .......................................... 264/95;
18/14 (S), 19 (R)

[56] References Cited
UNITED STATES PATENTS

| 2,952,874 | 9/1960 | Doyle | 18/14(S) |
|---|---|---|---|
| 3,009,200 | 11/1961 | Voight | 18/14(S) |
| 3,170,012 | 2/1965 | Stinchcombe | 264/95 |
| 3,300,555 | 1/1967 | Bild | 264/95 |

FOREIGN PATENTS

| 711,163 | 6/1965 | Canada | 264/95 |
|---|---|---|---|

*Primary Examiner*—J. Spencer Overholser
*Assistant Examiner*—Ben D. Tobor
*Attorney*—G. Baxter Dunaway ABSTRACT: The apparatus is used to flatten blown thermoplastic film so as not to produce brittle weakened folds. This is achieved by using nip rolls having relieved end sections so that a cushion of air is allowed to remain along each side where the crease would normally be found. The use of relieved end sections flatten the cushion but does not crease the film thus the film can still be easily wound into rolls yet has no creases and brittle weakness points along the side.

FIG. I.

GAYLON T. CLICK
EDWARD M. BANTA
INVENTORS

BY Kenneth H Johnson

PATENTED APR 27 1971
3,576,051
SHEET 2 OF 4
FIG. 2.
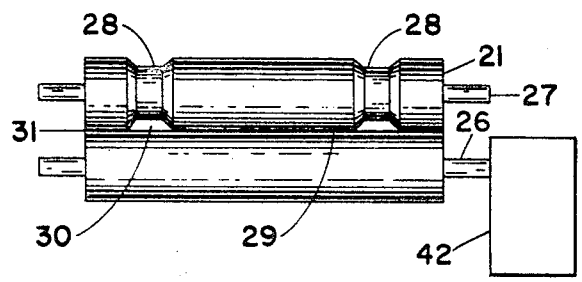
FIG. 3.
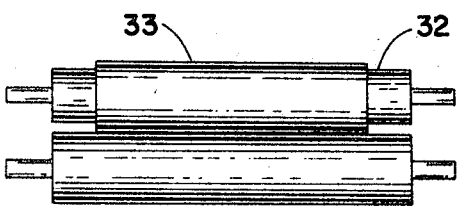
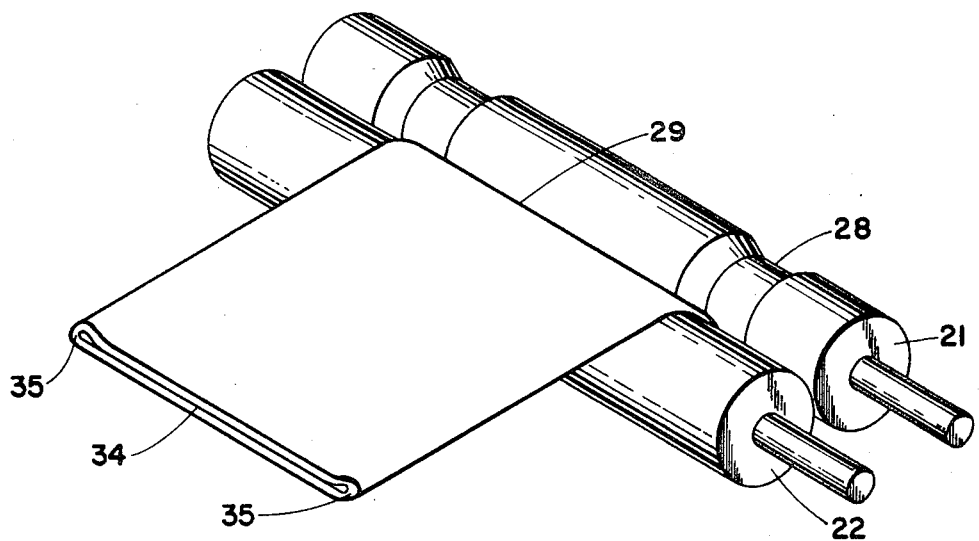
FIG. 4.
GAYLON T. CLICK
EDWARD M. BANTA
*INVENTORS*
BY *Kenneth H. Johnson*

FIG. 5.
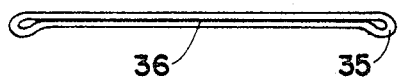
FIG. 7.
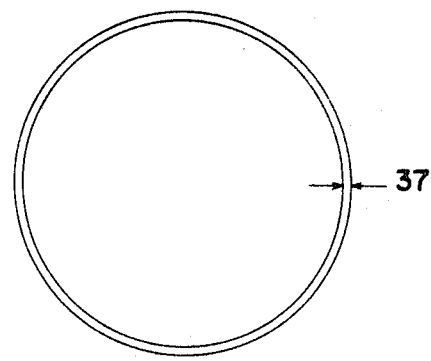
FIG. 6. PRIOR ART
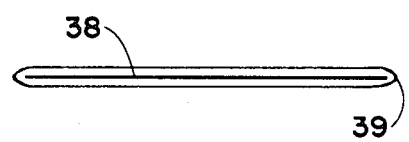
PRIOR ART FIG. 8.
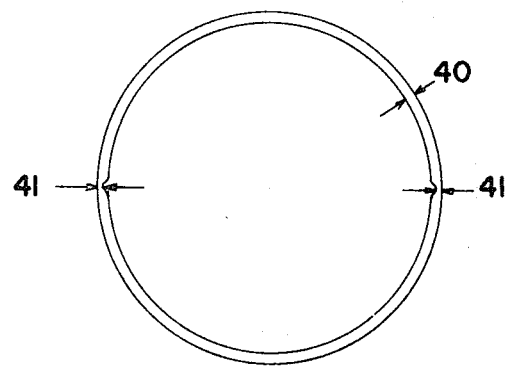
GAYLON T. CLICK
EDWARD M. BANTA
*INVENTORS*
BY *Kenneth H Johnson*

APPARATUS FOR PRODUCING THERMOPLASTIC FILM

This is a Divisional of application Ser. No. 523,162, filed Jan. 26, 1966.

This invention relates to a novel method and apparatus for producing thermoplastic film. In one of its aspects, this invention is directed to a method and apparatus for obtaining tubular thermoplastic film having nonbrittle seams or folds. In one of its more particular aspects, this invention is directed to an improved apparatus and method for collapsing or flattening blown tubular film without weakening the walls of the tubular film. In still another aspect, this invention is directed to a novel method and apparatus for producing flexible and collapsible polybutene tubing having nonweakened, nonbrittle seams or folds.

Many thermoplastic materials may be "blown" into thin sheets or tubular film having a thickness of less than 0.01 mil or sometimes up to thicknesses as high as 5 mils without encountering any particular manufacturing difficulties or product deterioration. However, when attempts are made to obtain a thermoplastic film having a wall thickness of 5 mils or greater or if the thermoplastic material used in producing the thermoplastic film is susceptible to creasing substantial weakening of tubular products produced from such film generally occurs.

According to certain prior art processes a combination of steps is employed whereby the thermoplastic material is extruded in molten form as a thick tubular sleeve which is subsequently expanded by a gas under pressure. As the sleeve is being extruded and expanded, it is normally drawn from the extruding assembly and then collapsed or flattened by passage between a pair of rotating nip rolls. The flattened tubular film is then collected on a collecting roll. The expansion gas used in expanding the tubular sleeve is normally retained under pressure within the tube by the die of the extruder at one end and a rollup roller at the other end.

The weakening of the tubular walls of thermoplastic film obtained by the blown film process generally occurs when the thermoplastic film is flattened or collapsed due to the formation of sharply creased folds along the edges of the collapsed tubular film. These creased folds generally result in a thin, brittle line running parallel along either side of the tubular product. The presence of this thin, brittle line along either side of the tubular film substantially weakens the overall strength of the film and seriously limits its use under pressure. It has been further found that when a tubular product manufactured from this weakened film is pressurized to its bursting pressure, a break occurs in the tubular product which runs parallel with the tube along the fold of the tubing, rendering substantial lengths of the tubing useless.

It is therefore an object of this invention to provide an apparatus and process which overcomes the tubular seam or fold weaknesses heretofore obtained by blown film extrusion methods. Another object of this invention is to provide an apparatus and method for producing blown film having strength characteristics equivalent to that of seamless or foldless blown film. Another object of this invention is to provide an apparatus and process for collapsing or flattening blown thermoplastic film without forming weakened or brittle seams or folds along the edges of the collapsed or flattened tubular film. A more particular object of this invention is to provide an apparatus and method for producing polybutene blown film having nonweakened and nonbrittle folds or seams. Another object of this invention is to provide a pair of improved nip rolls which overcomes the limitations associated with nip rolls previously used. Other objects of this invention will be apparent from the disclosure which follows.

These and other objects of this invention are accomplished by the apparatus and process hereafter described and in the accompanying drawings which depict particular embodiments of the apparatus and process of this invention.

Briefly stated, the apparatus and process of this invention comprises a unique and novel pair of nip rolls for receiving, drawing and collapsing extruded "blown" thermoplastic film. The film thereby produced possesses a uniform strength and thickness which heretofore was difficult, if not impossible, to obtain.

The nip rolls may be more specifically described as comprising a pair of coacting contrarotating substantially cylindrical nip rolls having at least two circumferential depressions at or near the ends. The depressions provide the nip rolls with a tangential center section and two relieved end sections which are conterminously related with the circumferential depressions. In operation the blown thermoplastic film is generally flattened or collapsed by simultaneously passing over one roller which is rotating in a certain direction and by passing under the other roller which is rotating in the opposite direction. For convenience in the description below the roller over which the tubular film passes is normally called the back or lower roller, while the roller under which the tubular film passes is normally called the front or upper roller. Also for convenience, throughout this description the upper or front roller will generally be referred to as the roller having the circumferential depressions, while the back or lower roller will be referred to as the roller having the smooth continuous surface free of circumferential depressions. However, it should be understood that these rollers can be interchanged. The upper roller can be further described as having a continuous middle or center section of relatively constant diameter and at least two relieved end sections having a diameter smaller than that of the middle or center section of the upper roller. In operation, the continuous middle or center section of the upper roller is in cooperative and tangential relationship with the lower roller forming the tangential center section of the nip rolls. The relieved end sections of the upper roller, which are in conterminous relationship with the depressions on the upper roller, are separated from the surface of the lower roller forming the relieved end sections of the nip rolls.

In utilizing the apparatus and nip rolls of this invention, the expanded blown thermoplastic film is drawn toward, and received by, the contrarotating rollers at a rate approximating the rate of extrusion and expansion of the blown film. As the blown film is received by the contrarotating rollers from the extruder the centermost portion of the film is collapsed and pressed between the continuous center section of the upper roller and the surface of the lower roller (tangential center section of nip rolls). Simultaneous with the collapsing of the center section, the side edge sections of the film are also flattened, but such flattening occurs without creasing the edges of the flattened film. This edge flattening is accomplished by passage through the space provided by the relieved end sections of the upper roller and the continuous surface of the lower roller.

By passage of the thermoplastic film through the nip rolls in the manner above described, the inner walls of that portion of the collapsed tubular film which is passing through the center section of the nip rolls are held fast together. This holding together or adherence of the inner walls of the flattened tubing is generally referred to in the art as "blocking" and is attributed to the viscid properties associated with partially set thermoplastic materials. This blocking or adhering effect divides the collapsed tubular film into a blocked center section and two nonblocked edge sections. The nonblocked edge section of the film retains small amounts of the gaseous material used in expanding or blowing the thermoplastic film. This retention of gas along the edges of the flattened film results in two gas inflated thermoplastic cushions along each side of the blocked center section. By utilizing the above described apparatus, the formation of sharply creased edges or folds during the collapsing step of blown film extrusion is avoided.

Reference now to the drawings will further explain various embodiments of the invention wherein like numbers refer to like parts and in which:

FIG. 2 is a front view of one embodiment showing a pair of nip rolls in cooperative contact.

FIG. 3 is a front view of an alternative embodiment of a pair of nip rolls.

FIG. 4 is an isometric view of nip rolls shown in FIG. 2 discharging thermoplastic film.

FIG 5 is a plan cross section of flattened or collapsed tubing obtained by the apparatus of this invention.

FIG. 6 is a plan cross section of collapsed tubing obtained by nip rolls not having relieved end sections.

FIG. 7 is a plan cross section of the tube shown in FIG. 5 expanded and under pressure.

FIG. 8 is a plan cross section of the tubing shown in FIG. 6 expanded and under pressure.

Figure 1:
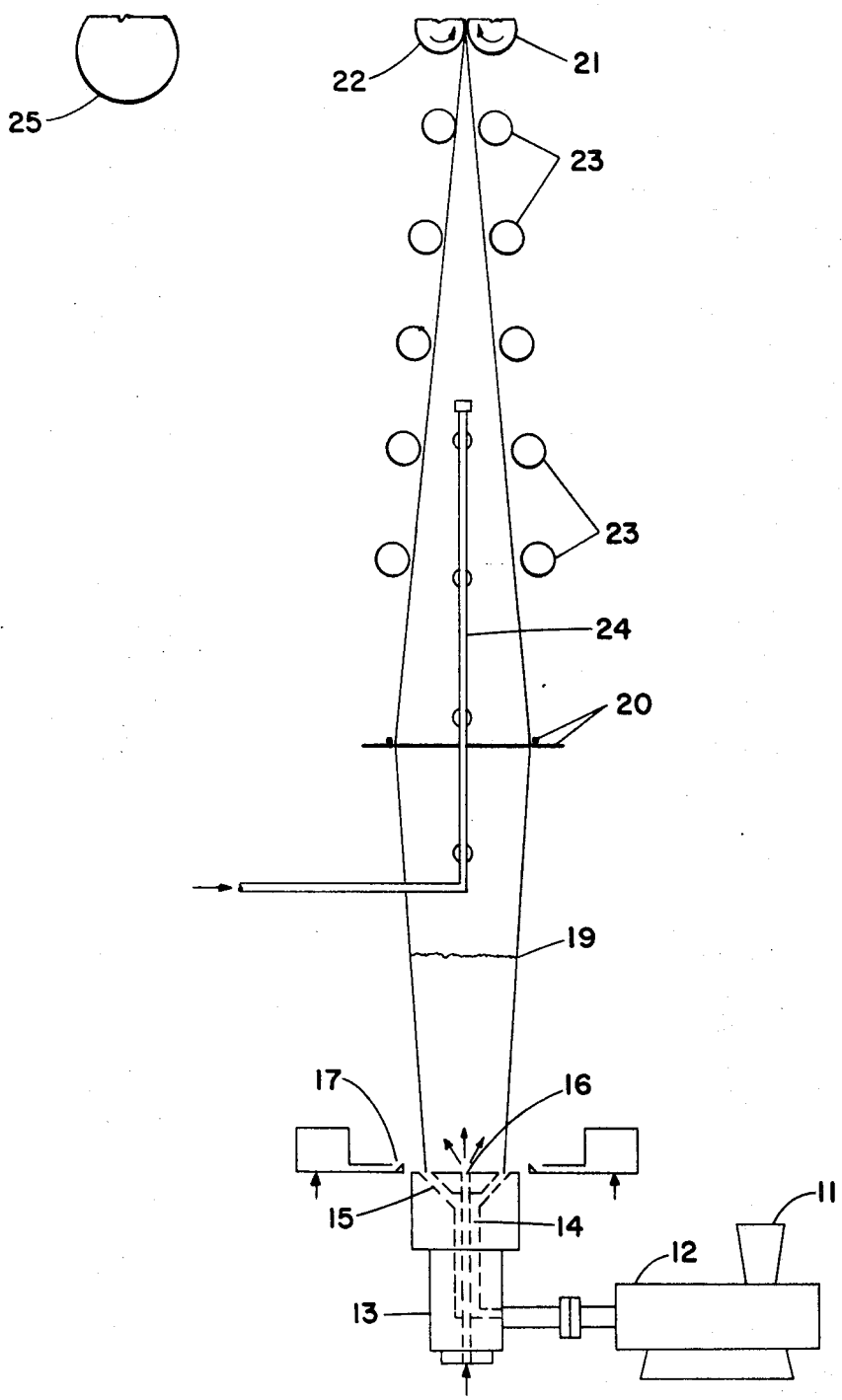
FIG. 1 is a side elevation view of the apparatus embodying the invention in which the frame supporting the main parts of the apparatus is omitted for clarity.

Referring first to FIG. 1, it will be seen that the principal parts of the apparatus for producing thermoplastic film include a hopper 11 for receiving polymeric particles for feeding into an extruding means normally consisting of a screw forced extruder cylinder 12, a die assembly 13, and an expanding means 16. Although the polymeric particles are generally introduced into the hopper in the form of pellets having a diameter of about one-sixteenth inch to one-half inch, any form of thermoplastic material may be used which has a relatively high bulk density and which preferably is substantially free of solvent. As the thermoplastic material is screw forced through the extruder cylinder, the thermoplastic material is melted by a heating means (not shown) prior to reaching die assembly 13. At this point, the thermoplastic melt is forced through die 14 and around an oval shaped mandrel 15 to form a rather thick polymeric sleeve. During extrusion, the thermoplastic material is normally maintained at a temperature slightly above its melt temperature and at a pressure which is consonant with the desired rate of extrusion. For example, when the thermoplastic material is a polymer, such as polybutene polymer, the thermoplastic melt can be forced through the die and around the mandrel at a temperature of between about 200° F and 600° F. and at a pressure of from between about 30 to 500 atmospheres.

A controlled amount of a gaseous material such as air is then introduced from the center of the die and mandrel into the sleeve of thermoplastic material through a gas nozzle type expanding means 16 under a pressure sufficient to expand the molten thermoplastic material. The rate of bubble expansion is dependent upon the thickness of the thermoplastic material as it leaves the mandrel and upon the desired thickness of the expanded polymeric film. The degree and rate of expansion also depends to some degree upon the type of thermoplastic material being extruded. For example, if the thermoplastic material is polybutene-1 polymer and if a minimum amount of biaxial orientation is desired, the polybutene-1 polymer is generally expanded to a diameter of no greater than twice the diameter of the mandrel. The desired diameter of the bubble may be conveniently controlled by varying the amount of air introduced into the thermoplastic sleeve by utilizing a suitable control means such as a pressure control valve.

Refrigerated air is directed against the periphery of the semimolten bubble through a refrigerated cooling means 17 to cool and harden the extruded thermoplastic material as rapidly and as soon thereafter as the desired bubble size is obtained. Generally, the refrigerated cooling means includes a circular gas duct having a plurality of nozzles for directing the flow of cooling gas at a rate and velocity conductive to quick solidification or hardening of the blown thermoplastic film. These gas nozzles are preferably located in close proximity to the die and mandrel, permitting refrigerated air to come in contact with the thermoplastic material as soon as the thermoplastic material is extruded from the die and is expanded. The solidification or hardening point of the blown thermoplastic material is indicated by a "frost line" 19 and may be raised or lowered by varying the cooling rate. A plurality of sizing guides 20 are positioned along the length of the bubble to assist in maintaining a constant bubble size and in maintaining the passage of the bubble in direct line with the nip rolls. Prior to the expanded thermoplastic material being received by nip rolls 21 and 22, the thermoplastic bubble is gradually flattened by guide rolls 23.

In a preferred embodiment of this invention, additional cooling is directed by air nozzles 24 to that area of the bubble which will eventually form the seams or folds of the collapsed bubble or tube. It has been found that this additional cooling is particularly advantageous when the film blown has a slow rate of setting. Examples of slow setting thermoplastic materials include polybutene-1 polybutadiene, and copolymers of polybutene-1 and polybutadiene. This additional cooling is directed to only the edge sections of the thermoplastic material, permitting the centermost section of the thermoplastic film to remain in a partial set condition. The use of this additional cooling insures rapid and increased "setting" of the edge sections of the collapsed thermoplastic tube while maintaining the center section of the tube in an incomplete set condition which will allow for easy "blocking" of the inner walls of the tube. As the collapsed thermoplastic tube passes through nip rolls 21 and 22, the flattened tubing is eventually collected on windup roll 25.

FIG. 2 is a front plan view of one embodiment of this invention showing a pair of nip rolls comprising an upper or front roller 21 and a lower or back roller 22 in cooperative or coacting pressing contact. Each of the rollers has a centrally mounted roller shaft 26 and 27, respectively, upon which the rollers can rotate with the roller shaft 26 connected to a rotatably driving means 42. The nip rolls are generally positioned in such a manner that the collapsed tubing passes over and slightly around roller 22. Although the manner in which the collapsed tubing is taken off the rollers is not critical to the operation of this invention, the collapsed tubing generally forms a bend of about 90° to 180° around roller 22.

The rollers can be positioned one on top of the outer as is shown in FIG. 2 or side by side as is shown in FIG. 1. In either case the thermoplastic film passes over the back or lower roller (i.e., the roller without depressions). A driving means 42 is generally connected to the lower or back roller 22 for rotating the roller at a rate approximating the rate at which the thermoplastic melt is extruded from the extruding means. The nip rolls are substantially cylindrical in shape with at least one of the rollers having a surface which will grip and draw the blown film toward the rollers. Preferably, both of the rollers will have a resilient surface coating which may be a rubbery-type substance such as a polyurethane.

The lower roller will normally have a continuous surface of relatively constant circumference or diameter, while the upper roller will have at least two circumferential depressions 28 located near or at the roller end sections. These depressions provide the nip rolls with a continuous tangential center section 29, at least two relieved end sections 30, and at least two contactual end sections 31. It has been found that the contactual end sections 31 are important structurally as they support the rollers and alleviate any bowing or bending of the upper roller during operation.

As may be seen, the depressed sections of the upper roller will have a diameter smaller than the diameter of the continuous center section of the upper roller. Generally, the depressed area will have a diameter of from 0.01 inch to 1 inch less than the diameter of the continuous center section. Preferably, the depressed section will have a diameter of from 0.05 inch to 0.2 inch less than the diameter of the continuous center section when the diameter of the center section is between about 3 inches and 6 inches. The above dimensions, however, may be varied depending primarily on the thickness of the film being produced. As a general rule of thumb, the depth of the depressions will be about 5 to 20 times the thickness of the film being produced. For example, if the tubular film being blown has a wall thickness of about 15 mils, the depth of the depression will generally range from about 0.07 inch to about 0.3 inch.

FIG. 3 is a front view of an alternative design of a pair of nip rolls encompassed within this invention. In this FIG., the rollers have continuous depressions 32 extending outwardly from the end of the center section 33 of the upper roller. If the center section of the roller makes up approximately 85 percent to 95 percent of the length of the upper roller, bowing or bending is not noticeable and the contactual end sections may be omitted.

In operation the expanded thermoplastic film is drawn between the nip rolls by the grasping surface of the rollers at a rate approximating the rate of extrusion. As the film passes through the rolls, the centermost portion of the tubular film comes in intimate and pressing contact with the continuous center section of the upper roller and the surface of the lower roller. The edge sections of the tubular film passes through the space provided by the relieved section of the upper roller and the surface of the lower roller.

When nip rolls such as those shown in FIG. 2 are used, the contactual end sections are in pressing contact with the surface of the lower roller; however, the edges of the thermoplastic film do not pass between these sections of the roller. As previously noted, these contactual end sections are present merely for the purpose of giving the rollers added support during operation.

FIG. 4 is an isometric view of a flattened tubular film being discharged from a pair of rollers such as that shown in FIG. 2.

As the blown thermoplastic film passes between upper roller 21 and lower roller 22, the blown film is flattened or collapsed, forming two superimposed foils. During the collapsing operation the centermost portion of the blown film 34 is blocked by its passage between the continuous center section of roller 21 and the surface of roller 22. The side or edge sections of the collapsed film passes through the relieved end sections 28 of the roller, forming two parallel edge cushions 35 of thermoplastic material inflated with a small portion of the gaseous material used in expanding the extruded thermoplastic melt.

It will be seen that the gaseous material which inflates the parallel edge cushions is retained within each cushion and is kept separate by the blocked centermost portion of the thermoplastic tube 34. The expansion gas is further retained under pressure within the tube and the cushions by the die of the extruder at one end and the rollup roller at the other end. The extent of the blocking of the center portion of the collapsed tubular film, therefore, must be sufficient to maintain the edge sections of the tube in an inflated condition and to prevent the escape or substantial diffusion of the trapped gaseous material within the cushion area. As previously noted, this desired amount of blocking is obtained by controlling the rate of setting of the thermoplastic film. As is shown in FIG. 1, refrigerated air ducts 17 may direct cooling air over the entire lower superficial surface of the blown film. Preferably, most of the cooling is directed to that area of the film in close proximity to the die. The secondary refrigerated air system shown in FIG. 1 as 24 may be directed to that portion of the blown film which will eventually form the edges or folded sections of the collapsed film. This additional cooling insures a higher rate of thermoplastic setting along the edge sections of the blown film and thereby minimizes the possibility of inadvertent blocking of the edge sections. The centermost portion of the blown film is cooled to a point which is conducive to effective blocking of the centermost portion during either the expansion or flattening sequences.

FIG. 5 shows an enlarged plan cross section of collapsed film produced by the apparatus of this invention. The inflated cushions of thermoplastic material 35 are separated by the blocked center section 36 of the film.

FIG. 7 shows the collapsed film shown in FIG. 5 after expansion by pressure. It can be seen that the thickness of the film 37 is substantially the same along the walls of the tubing. Because of this constant wall thickness, the film is uniformly strong under pressure.

FIG. 6 shows a collapsed thermoplastic film obtained by conventional flattening apparatus, i.e., apparatus having conventional continuous surfaced nip rolls in which the entire surface of one roller is in tangential contact with the other roller. it can be seen that by using the conventional type of nip rolls, tubular film is completely flattened and the inner walls 38 of the film are in contact, forming sharply creased edges 39 along the sides of the flattened film.

FIG. 8 shows the collapsed film of FIG. 6 after expansion by pressure. It can be seen that the thickness of the film 40 is substantially the same, except for two thinner sections 41 which correspond to the creased or folded edges 39 in FIG. 6 of the collapsed film.

The process and apparatus of this invention may be used for producing thermoplastic film from a variety of thermoplastic materials. Generally, this invention contemplates the use of, for example, polymers of alpha olefins or diolefins having the general formula $R-CH=CH_2$, wherein R preferably has from one to 12 carbon atoms and is an aromatic, aliphatic or cycloaliphatic radical of either a saturated or unsaturated variety. Halogen substituted polymers derived from halogen substituted alpha olefins or halogenated polymers may also be used. Examples of the above polymers include polypropylene, polybutene, polybutadiene, polystyrene, polypentene, polyheptene, polyisobutylene, polyisoprene, poly(3-phenyl propene-1), poly (3-phenyl butene-1), poly(4-phenyl butene-1), polybicyclo(2,2, 1-heptene-2), polycyclopentadiene, neoprene, and the like. Mixtures and copolymers of the above may also be used.

Examples of other useful thermoplastic materials include cellulose acetate, cullulose acetate butyrate, methyl methacrylate, nylon, polyvinyl formyl-acetate butyral, polyvinyl chloride, and copolymers thereof.

This invention is particularly applicable to alpha olefin polymers from monomers having from 3 to 14 carbon atoms and, more particularly, to polymers of alpha olefins having from 3 to 8 carbon atoms. This invention is particularly well adapted to polybutene-1 or olefin copolymers wherein butene-1 is the major monomer and ethylene, propylene and mixtures thereof are minor components, and which polymers have a specific gravity of at least 0.88 at 20° C., preferably between 0.90 and 0.92 or higher, and a crystallinity of at least 10 percent, preferably between 35 percent and 60 percent crystallinity at ordinary atmospheric temperatures. Examples of particularly suitable polymers are disclosed in Ser. No. 509,401, entitled "Improved Polymers," and filed Nov. 23, 1965.

A useful polymerization method for the production of polymers which can be used in producing film by the method and apparatus of this invention can be found in U.S. Pat. No. 2,825,721 issued on Mar. 4, 1958. According to this patent, polymers are obtained by polymerizing olefin compounds in the presence of chromium oxide associated with at least one oxide selected from the group consisting of silica, alumina, zirconia, and thoria. The polymers produced therefrom are characterized by the fact that their unsaturation is predominantly of the transinternal or terminal vinyl type. Certain of the polymers are characterized in that their unsaturation is almost entirely of the terminal vinyl structure. In one embodiment of this patent, aliphatic olefins containing 2 to 8 carbon atoms are polymerized in the presence of a hydrocarbon diluent. Aliphatic, cycloaliphatic or aromatic type hydrocarbons may be used as the diluent. The reaction is ordinarily conducted at a temperature up to about 500° F. and preferably between 150° F. to 320° F. under a pressure sufficient to maintain the reactants and diluents in the liquid state. The reaction is carried out with a catalyst comprising chromium oxide supported on a carrier such as silica, alumina, zirconia, and so forth. The catalyst is obtained by impregnating a silica-alumina complex with an aqueous solution of a chromium compound convertible to chromium oxide upon heating and calcining same under nonreducing conditions such as in the presence of air, oxygen, $CO_2$, etc., at a temperature in the range of 750° F. to 1500° F., whereby the chromium compound is converted to chromium oxide in which the chromium is in the hexavalent form. The chromium oxide is present in an amount of at least 0.1 weight percent based on the weight of the total catalyst. The temperature which can be used to carry out the polymerization reaction can vary over a broad range, but normally ranges from 100° F. to 500° F. and preferably ranges between 150° F. and 450° F. The preferred range for propylene and higher olefins is 150° F. to 250° F. when a fixed bed catalyst is used. When a mobile catalyst is used, the preferred polymerization temperature for propylene or higher olefins is about 180° F. to 200° F.

The polymerization process of U.S. Pat. No. 2,825,721 described above is preferably maintained at a pressure high enough to maintain a liquid phase reaction. Normally, a pressure of at least 100 p.s.i. to 300 p.s.i. is required. However, pressures as high as 500 p.s.i. or even 700 p.s.i. can be used, if desired. As a general rule, higher pressures favor the production of high molecular weight polymer with all other conditions being constant. Molecular weights of propylene of between 2,000 and 50,000 can be obtained by utilization of the above described conditions. The feed rate can range from 0.1 to 20 liquid hourly space velocities in a liquid phase process with a fixed bed catalyst.

Another highly advantageous process which may be employed for obtaining thermoplastic materials for use in preparing thermoplastic film by the apparatus and process of the instant invention utilizes a different type of catalyst. For example, polymers can be prepared in the presence of polymerization catalysts which are generally known as "Ziegler" type polymerization catalysts. A complete description of some of the catalysts which may be utilized can be found in the U.S. Pat. No. 3,113,115, to Ziegler et al. issued on Dec. 3, 1963. The Ziegler et al. patent discloses the mode of preparing a polymerization catalyst from a transitional metal compound, preferably a halide, and a reducing component consisting normally of a metal alkyl compound. Representative of a transitional metal compound which may be used include those selected from Groups IVB, VB and VIB of the Periodic Table. Included in the preferred species are the titanium halides, for example, titanium tetrachloride, titanium trichloride, and titanium dichloride, and mixtures thereof. Other metal compounds, such as zirconium tetrahalide, hafnium tetrachloride, vanadium chloride, chromium chloride, tungsten chloride, and the like, are especially useful. Still other transitional metal halides containing halogens selected from the group consisting of bromine, iodine, chlorine, and, in certain instances, fluorine, can also be used.

The reducing component of the Ziegler catalyst composition may be any of a variety of reducing agents. Most common among the reducing agents are organometallic compounds such as triethyl aluminum, aluminum diethyl chloride, aluminum diethyl hydride, aluminum triisobutyl, aluminum triisopropyl, and related compounds. Many other reducing agents, such as lithium aluminum hydride, zinc diethyl hydride, and the like, are described in the literature as useful reducing agents and can also be used. These catalysts are of the now well-known "Ziegler" variety.

In the catalytic complex comprising a transitional metal compound and a reducing component, the ratio of constituents may be varied over a relatively broad range. The preferred range depends to a large extent on the operating conditions, the hydrocarbon to be polymerized, and the choice of catalyst to be used. In a catalyst where one mol of titanium halide is used, the triethyl aluminum compound may be varied from about 0.5 to 5 mols or even 10 mols. In using the above catalyst, a number of procedures may be employed. For example, the catalyst complex may be preformed and preactivated prior to combining the complex with the hydrocarbon feed. In another technique, the catalyst may be combined in an inert solvent and this slurry added to or combined with the hydrocarbon feed. In some instances, the catalyst components may be added directly to the hydrocarbon feed. The polymerization reaction is generally conducted in the presence of an inert organic solvent or in the presence of an excess of monomer. While the catalyst may be prepared over a wide range of temperatures, the catalyst will usually be prepared at a temperature between 30° C. and 150° C. The amount of catalyst may be varied quite widely and may be as low as 0.01 weight percent based on the weight of the monomer to be polymerized, but normally will be in the range of about 0.5 to about 5—10 weight percent. The polymerization reaction is normally conducted at temperatures below 250° C. and at pressures below 300 atmospheres and usually at temperatures of between 25° C. and 150° C. and at about 1—50 atmospheres.

The polymeric reactions may be conducted in bulk or inert diluents may be present. Preferred diluents are the inert liquid hydrocarbons, the alkanes, such as propane, butane, pentaner, heptane, and the like; however, such materials as isooctane, cyclohexane, benzene, toluene, and the like, are also useful. The polymer formed by the above described processes may then be solidified into free flowing particles having a high bulk density by utilizing methods well known in the art.

Still more specifically, a patent by Natta et al., U.S. Pat No. 3,141,872, issued on July 21, 1961, describes in detail a preferred technique directed primarily to the production of polypropylene. According to the Natta et al. patent, polymerizates of unsaturated hydrocarbon, and particularly propylene consisting substantially of isotactic macromolecules, can be obtained by using a solid crystalline titanium halide in which the titanium has a valence lower than the maximum valence corresponding to its position on the Periodic Table. The polymerization catalyst is prepared from the powdery (crystalline solid) titanium trichloride suspended in a hydrocarbon and adding thereto a metal alkyl compound, such as triethyl aluminum or diethyl aluminum monochloride, and subsequently heating the suspension to a temperature of from 50° C. to 90° C. By this process, a catalyst is obtained which permits control of the polymerization of unsaturated hydrocarbons, so that polymers which are produced are substantially made up of isotactic macromolecules. The polymerization of propylene, according to Natta et al., is carried out in a liquid diluent which is substantially inert to the metal alkyl or alkyl metal chloride in the substantial absence of air and water and preferably is conducted under an atmosphere of an inert gas such as nitrogen. The hydrocarbon solvents which may be used in preparing the catalyst and which can be used as the polymerization media are preferably paraffinic hydrocarbons including a light gasoline, heptane, isooctane, and the like. The hydrocarbon solvent may also be the monomer to be polymerized. The polymerization may be carried out at temperatures between 20° C. and 120° C. under atmospheric pressures or low pressures up to 30 atmospheres above normal atmospheric pressure.

In a patent to Seelbach et al., U.S. Pat. No. 2,964,510, issued Dec. 13, 1960, the polymerization of butene-1 is described. According to this patent, the polymerization is conducted with a catalyst which is a complex or reaction product of an alkyl metal compound, such as diethyl aluminum chloride or aluminum sesquichloride (an equal molar mixture of aluminum diethyl chloride and aluminum ethyl dichloride) with a compound of titanium, e.g., titanium tetrachloride.

The temperature to be used in carrying out the polymerization according to this patent is generally about 25° C. with a pressure of between one and 100 atmospheres. The process may be conducted in the presence of a substantial amount of liquid diluent which may be an inert aliphatic hydrocarbon preferably having about 6 to 20 carbon atoms or various aromatic hydrocarbons or other inert solvents. The polymerization reaction may also be conducted in the absence of a solvent, i.e., in the presence of only butene-1.

Although any desired method of contacting the butene with the catalyst may be used, in the Seelbach et al. patent a preferred method is to pass the olefin as a gas or vapor or even as a liquid into the catalyst slurry with good agitation.

Polymerization occurs and continues at a rate which varies somewhat according to the nature of the polymerization feed, the catalyst, and relative concentrations of both the feed and catalyst in respect to the amount of diluent present.

In preparing the catalyst, the preferred procedure is to make a solution of the desired alkyl metal compound in a suitable solvent, such as n-heptane, and make a separate solution of titanium tetrachloride, also in an inert solvent such as n-heptane, and then mix the two solutions in the desired proportions at room temperature. The mixture of these two catalyst components generally causes the formation of a precipitate which is desirably kept in suspension by agitation. According to Seelbach et al., the mol ratio of the aluminum compound to the titanium compound in the catalyst mixture is generally about 6 mols of aluminum per mol of titanium. If solid high molecular weight insoluble polymer is desired, diethyl aluminum chloride is normally used. However, if lower molecular weight polymer is desired, then the sesquichloride is normally used.

In still another, U.S. Pat. No. 3,008,945, issued Nov. 14, 1961, to Saltman, a catalyst and process is described for the preparation of 1.4-transpolyisoprene. According to this patent, isoprene is polymerized to form 1.4 addition, transconfiguration polyisoprenes in the presence of a catalyst comprising an aluminum alkyl, titanium tetrachloride and ferric chloride. In general, isoprene is polymerized in the presence of this catalyst system while the isoprene is dissolved in an inert solvent or diluent. The use of inert solvents or diluents provides a means for controlling the heat of reaction and thereby does not directly affect the rate of polymerization. The solvent-monomer ratio employed can be varied over comparatively wide limits, for instance, from as low as 1:2:1 or up to 20:1 or more. The temperature employed in the polymerization of monomeric isoprene may be varied broadly between a low temperature such as 0° C. up to a temperature of 90° C. or more. Preferably, the polymerization temperature is approximately 50° C. at a pressure of below 100 atmospheres. The preferred molar ratio of aluminum/titanium/iron is 10/1/5. The aluminum alkyl portion of this catalyst may be any alkyl radical such as aluminum triethyl, aluminum trihexyl, aluminum triheptyl, aluminum tripropyl, aluminum triisobutyl, and the like. Of these, aluminum triisobutyl is preferred.

As is indicated by the prior art, various type solvents may be used as a vehicle for the polymerization reaction. However, certain solvents possessing certain properties are particularly useful. Generally, a solvent having a vapor pressure below 30 atmospheres at 20° C. is employed. Preferably, the solvent will have a boiling point above −50° C. and below 70° C. However, a solvent having a boiling point to about 150° C. can also be used under certain conditions. A solvent having a boiling point between −10° C. and 30° C. and a vapor pressure of between 10 and 50 atmospheres at 20° C. and having from 3 to 10 or 3 to 6 carbon atoms is still more preferred. Examples of suitable solvents include propane, propylene, n-butane, isobutane, butene-1, butene-2, pentane, pentene, isopentene, hexene, hexane, cyclohexane, heptane, heptene, and methylchloride. However, other aromatic, aliphatic or cycloaliphatic solvents can be used. The monomer to be polymerized can also be used to advantage as a solvent.

Where the polymer is polybutene-1, preferred organic solvents include those selected from the group consisting of propane, butane, isobutane, butene-1, butene-2, and mixtures thereof.

Where the polymer is polypropylene, preferred organic solvents include solvents selected from the group consisting of propane, propylene, isobutane, butane, butene-2, and mixtures thereof.

Where the polymer is polyisoprene, preferred organic solvent include solvents selected from the group consisting of propane, butane, isobutane, butene-2, pentane, pentene-2, 2-methyl butene-2, and mixtures thereof. Polymeric solutions comprising polybutene-1 in butene-1, polypropylene in propylene, polycisbutadiene in butadiene, polyisoprene in isoprene, polystyrene in styrene, and the like, may be used.

A better understanding of the invention may be obtained by referring to the following illustrative example which is not intended, however, to be limitative of the invention.

EXAMPLE 1

84 grams of ethyl aluminum sesquichloride-n-butane (7.86 percent) solution is transferred through a catalyst port into a 5-gallon autoclave to which is added 8.125 grams of the titanium trichloride. The mol ratio of ethyl aluminum sesquichloride to titanium trichloride is 2 to 1. An additional amount of n-butane is added to the autoclave through the catalyst port to wash the catalyst feedlines and thus assure that all the titanium trichloride has been transferred to the reaction vessel and to provide a catalyst slurry medium. 6,804 grams of n-butene-1 (preheated to a temperature of 60° C.) is rapidly introduced into the autoclave over a period of about 1 minute. A reaction temperature of 60° C.(±1°C.) is maintained over a reaction period of 2 hours by the use of the strip heaters and the cooling reflux condenser.

Gas samples are taken from a top autoclave vapor space sample port immediately after monomer addition and at 30-minute intervals during the polymerization on run for chromatographic analyses.

At the end of 120 minutes reaction time, the autoclave contents are withdrawn through a bottom port into a container containing isopropyl alcohol and water to deactivate the catalyst. Unreacted butene and other volatile hydrocarbons are vented from the container.

The product is dissolved in n-heptane at 80° C., washed with demineralized water to dissolve and remove the catalyst; stabilizers are added to the polymer solution and then the solution is steam stripped to remove the workup solvent. The polymer product is granulated, dried in a vacuum oven, and pelletized.

A representative sample of the pelletized pellets is tested and is found to possess a melt index of 0.44, a density of 0.9140, a yield strength of 2,300 p.s.i., a tensile strength of 4,635 p.s.i., and a low temperature brittleness of −15° C.

The polymer pellets are screw-forced into a heating means where the 20 polymer is melted and forced through a die having a die lip opening of about 0.35 inch. The die temperature is approximately 400° F. and the polymer is extruded through the die at a pressure of 2,000 p.s.i. The polymer is extruded as a thick tube. While the tube is in the melt state, it is expanded by introducing air into the center of the tube through the die to form a bubble having a diameter of approximately 1.75 times that of the diameter of the extruded thick tube. The bubble is cooled by blowing refrigerated air around the periphery of the bubble near the pint of extrusion.

The bubble was gradually flattened by guide rollers and collapsed to a tubular sheet by nip rolls such as that shown in FIG. 1 of the attached drawing. The nip rolls consisted of a lower roller having a diameter of 4 inches and length of 26 inches and an upper roller having a diameter of 4 inches, a continuous center section having a length of 11 inches, and two end depressions having a width of 2 inches and a depth of one-sixteenth inch. The depressions were cut on a slope of about 60°. Each of the rollers had a solid stainless steel rotatable shaft passing through the roller and each of the rollers was coated with a polyurethane material having a shore A hardness of between 60 and 70.

The tubular member thereby produced had a diameter of 8¼ inches and a wall thickness of 0.016 inch. The above tubing was field tested as irrigation tubing and was found capable of transporting water 800 feet from an irrigation reservoir over a 10 foot rise to an irrigation ditch. The water was forced through the tubing with a 6 inch tractor-mounted centrifugal pump operating at about 600 to 700 gpm.

EXAMPLE 2

The procedure described in Example 1 is repeated with the exception that the nip rolls used in collapsing the blown film are replaced with conventional type nip rolls. The nip rolls used in the instant example consist of a pair of rollers having a diameter of 4 inches and a length of 26 inches. Neither of the rollers possess the depressions described and used in Example 1. The tubular members produced in this example are essentially the same as the tubular members obtained in Example 1, with the exception that the instant tubular members possess sharply creased folds along the edges of the tubular member.

A quick burst hydrostatic pressure test is run on a 40-foot section of tubing produced by the procedure outlined in Example 1 and is compared with a 40-foot section of tubing produced by the procedure described in Example 2. The tests are conducted by closing one end of each of the tubes and pressurizing the tubes with water until the tubes burst. The pressure at which the tubes burst, as well as the type of burst which takes place, is noted. The theoretical burst pressure of the tubular walls was calculated, utilizing Barrow's Hoop stress formula. The thinner wall thickness resulting from the folds of the tubing produced in Example 2 is disregarded in arriving at the theoretical burst pressure of the tube.

The results of the burst test using tubing produced by conventional nip roll apparatus and that of apparatus of the instant invention demonstrates that the tubing produced in Example 2 possesses a burst pressure equivalent to 65.38 percent of the theoretical burst pressure, while the tubing produced in Example 1 possesses a burst pressure equivalent to 99—100 percent of its theoretical burst pressure.

Another significant difference between the tubing produced in Example 1 and Example 2 is that the burst or rupture of the tubing of Example 1 is contained or restricted to a 2-foot length of the tubing. The break or rupturing of the tubing produced in Example 1 is "star" shaped or circumferential, and this results in severing the tubing rather than tearing or ripping the tubing in a lengthwise direction. The tubing produced in Example 2, however, bursts and splits along one of its seams or folds and runs the entire 40-foot length of the tubing.

The type of break, as well as the pressure at which the break occurs, is important to the consumer from a replacement and economic standpoint, For example, less than 5 percent of the tubing produced by the apparatus and procedure described in Example 1 is lost when the burst pressure of the tubing was reached. However, with the tubing produced in Example 2, all 40 feet or 100 percent of the tubing is destroyed and must be replaced.

EXAMPLE 3

Polybutene-1 tubing of various wall thicknesses is produced by the procedures outlined in Examples 1 and 2. Burst strength tests are run on each of the tubes produced. The trends or relationships between burst strength and tubing thickness are determined and are graphically depicted in FIG. 9.

Figure 9:
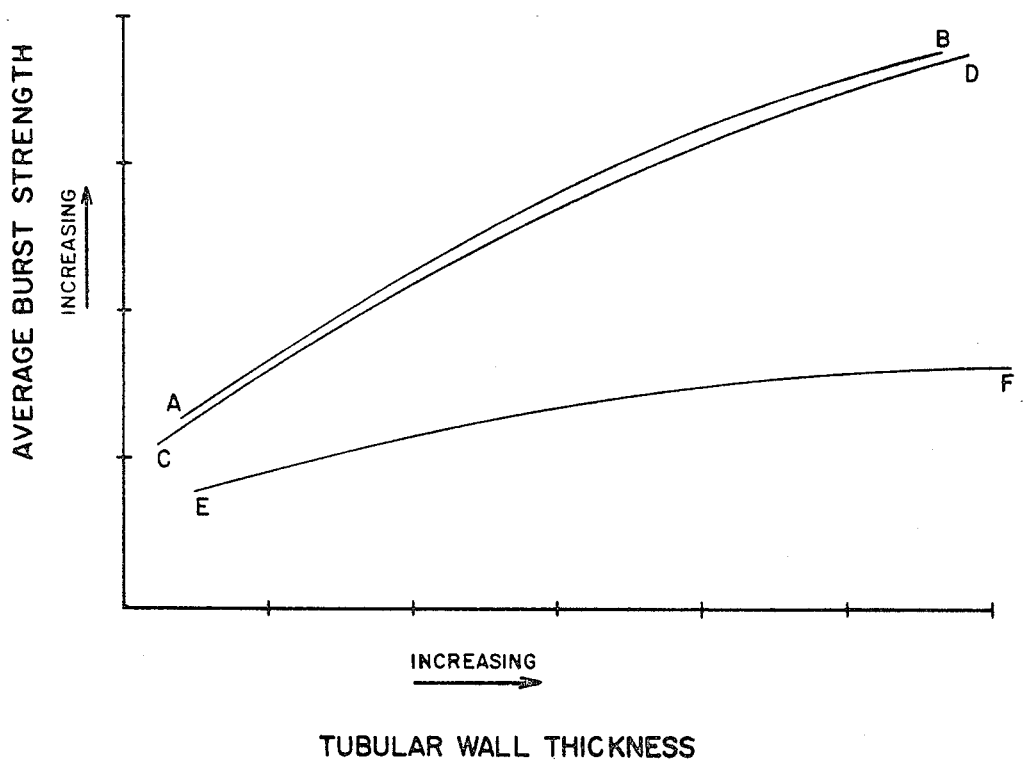
FIG. 9 is a trend chart depicting the relationship between tubular wall thickness and average burst strength of thermoplastic film obtained by the method and apparatus of this invention as compared to other methods.

The axis of abscisses of the graph shown in FIG. 9 represents polymer wall thickness and the axis of ordinates represents the average burst strength of the polymer. Line AB represents the theoretical burst strength of the polymer for a particular thickness. Line CD represents the average of burst strength of tubular members which are produced by the apparatus of this invention. The burst strengths obtained according to this invention approximated the theoretical burst strength of the polymer. However, for the sake of clarity in FIG. 9, Line CD is positioned slightly below Line AB. Line EF, on the other hand, represents the burst strength of tubular members obtained by methods described in Example 2. In these cases, the tubular members had sharply creased edges which lowered the average burst strength. It can be seen from the chart of FIG. 9 that as the tubular wall thickness is increased, the percent burst strength difference from the theoretical burst strength increases.

EXAMPLE 4

The procedure of Example 1 is repeated with the exception that the polybutene is produced by polymerizing, with the same catalyst system, a mixture of 93 mol percent n-butene-1 and 7 percent propylene-1. A further variation is that rolls as shown in FIG. 2 were employed in the apparatus as shown in FIG. 1. Tubing of high burst strength is produced and comparative results similar to those obtained in Examples 1 and 2 above are achieved when conventional rolls are substituted for the rolls shown in in FIG. 2.

EXAMPLE 5

Example 4 is repeated with the exception that the polymer used is polypropylene.

When the above tests are run on various other polymeric materials such as polyethylene, polypropylene, polyvinyl chloride, polybutadiene, copolymers and mixtures of the above, similar results are obtained.

We claim:

1. An apparatus for producing flattened tubular thermoplastic film having nonbrittle, nonweakened folds comprising an upper or front roller and a lower or back roller, said lower or back roller having a continuous surface of relatively constant circumference and said upper or front roller having circumferential depressions near each end of said roller, said depressions providing said upper or front roller with a continuous contactual center section, at least two relieved end sections, and at least two contactual end sections, said contactual center section and said contactual end section having a tangential and coacting relationship with said lower or back roller, said relieved end sections being conterminously related with said depressions.

2. The apparatus of claim 1 wherein the rollers have a surface comprising a resilient rubbery-type substance.

3. The apparatus of claim 2 wherein the relieved end sections of the roll have diameters of at least 0.01 inch less than the diameter of said center section.

4. The apparatus of claim 2 wherein said relieved sections have diameters of between 0.01 and 1.0 inch less than the diameter of said center section.

5. The apparatus of claim 1 wherein the rollers have a centrally mounted rotatable roller shaft and a driving means connected to one of said rotatable shafts for rotating said rollers in a contrarotating direction and for rotating said rollers at a rate for receiving the blown thermoplastic film approximating the rate of extrusion of the thermoplastic film from an extruding means.

6. The apparatus of claim 5 wherein the extruding means comprises a screw-type extruder, a circular die for extruding and forming a thick thermoplastic sleeve, and an expanding means located within said die and having a gas nozzle for emitting pressurized gas for expanding the diameter of said sleeve.

7. The apparatus of claim 6 wherein the extruding means includes a heating means for melting solid thermoplastic particles for extrusion as a thermoplastic melt.

8. The apparatus of claim 7 wherein the extruding means is adapted with a refrigerated cooling means for cooling the peripheral surface of the expanded thermoplastic melt, said cooling being concentrated in that area of the film which is in close proximity to said circular die.

9. The apparatus of claim 8 having in combination a secondary refrigerating means comprising a plurality of gas jets for directing cooling air against that portion of the expanded thermoplastic melt which will eventually form the edges or folded sections of the collapsed thermoplastic melt.

10. An apparatus for producing flattened tubular thermoplastic film having nonbrittle, nonweakened folds comprising a pair of contrarotating, cooperating rollers, the first of said rollers having a continuous surface of relatively constant circumference and the second of said rollers having circumferential depressions near each end of said roller, said depressions providing said second roller with a continuous contactual center section, at least two relieved end sections, and at least two contactual end sections, said contactual center section and said contactual end section having a tangential and coacting relationship with said first roller, said relieved end sections being conterminuously related with said depressions.